(12) United States Patent
Osterfeld et al.

(10) Patent No.: US 11,162,827 B1
(45) Date of Patent: Nov. 2, 2021

(54) METHOD AND SYSTEM FOR DETERMINING AT LEAST ONE PHYSICAL VALUE

(71) Applicant: Balluff GmbH, Neuhausen a.d.F. (DE)

(72) Inventors: Martin Osterfeld, Schlaitdorf (DE); Stephan Langer, Filderstadt (DE); Roland Schafer, Rottweil (DE); Albert Dorneich, Ostfildern (DE); Andrea Hiller-Brod, Weilheim (DE); Jorg Maier, Filderstadt (DE); Jochen Streib, Ostfildern (DE)

(73) Assignee: Balluff GmbH, Neuhausen (DE)

( * ) Notice: Subject to any disclaimer, the term of this patent is extended or adjusted under 35 U.S.C. 154(b) by 0 days.

(21) Appl. No.: 17/219,090

(22) Filed: Mar. 31, 2021

(30) Foreign Application Priority Data

Apr. 8, 2020 (DE) .......................... 102020109859.6

(51) Int. Cl.
*G01D 21/02* (2006.01)
(52) U.S. Cl.
CPC .................................... *G01D 21/02* (2013.01)
(58) Field of Classification Search
CPC .................................................... G01D 21/02
See application file for complete search history.

(56) References Cited

U.S. PATENT DOCUMENTS

| | | | |
|---|---|---|---|
| 4,863,270 A * | 9/1989 | Spillman, Jr. .......... | G01B 11/18 356/477 |
| 6,590,194 B2 * | 7/2003 | Sardana ............. | G01D 5/35383 250/208.1 |
| 2002/0077752 A1 * | 6/2002 | Burreson ............... | G01D 5/251 701/300 |
| 2006/0278240 A1 * | 12/2006 | Spillman, Jr. ...... | G01D 5/35341 128/898 |
| 2014/0257740 A1 | 9/2014 | Hamann et al. | |
| 2014/0334519 A1 | 11/2014 | Antonini et al. | |
| 2016/0213345 A1 * | 7/2016 | Star-Lack ............ | A61B 6/5282 |
| 2019/0331832 A1 | 10/2019 | Chandra et al. | |

FOREIGN PATENT DOCUMENTS

EP 1157319 B1 11/2001
JP 2015072143 A * 4/2015

* cited by examiner

*Primary Examiner* — Francis C Gray
(74) *Attorney, Agent, or Firm* — Gable Gotwals

(57) ABSTRACT

The at least one value is respectively determined from at least one measured value of the sensors (20-29) in a method for determining at least one physical value in a space (10) in which several sensors (20-29) are arranged which are set up to measurer the at least one value, for several positions (30) in the space (10) where there is no sensor (20-29). A system which is set up in order to determine the at least one physical value in the space (10) has several sensors (20-29) which are arranged in the space (10). Furthermore, it has a database, in which information about the space (10) is stored, and a computer which is set up in order to determine the at least one value by means of the method.

13 Claims, 2 Drawing Sheets

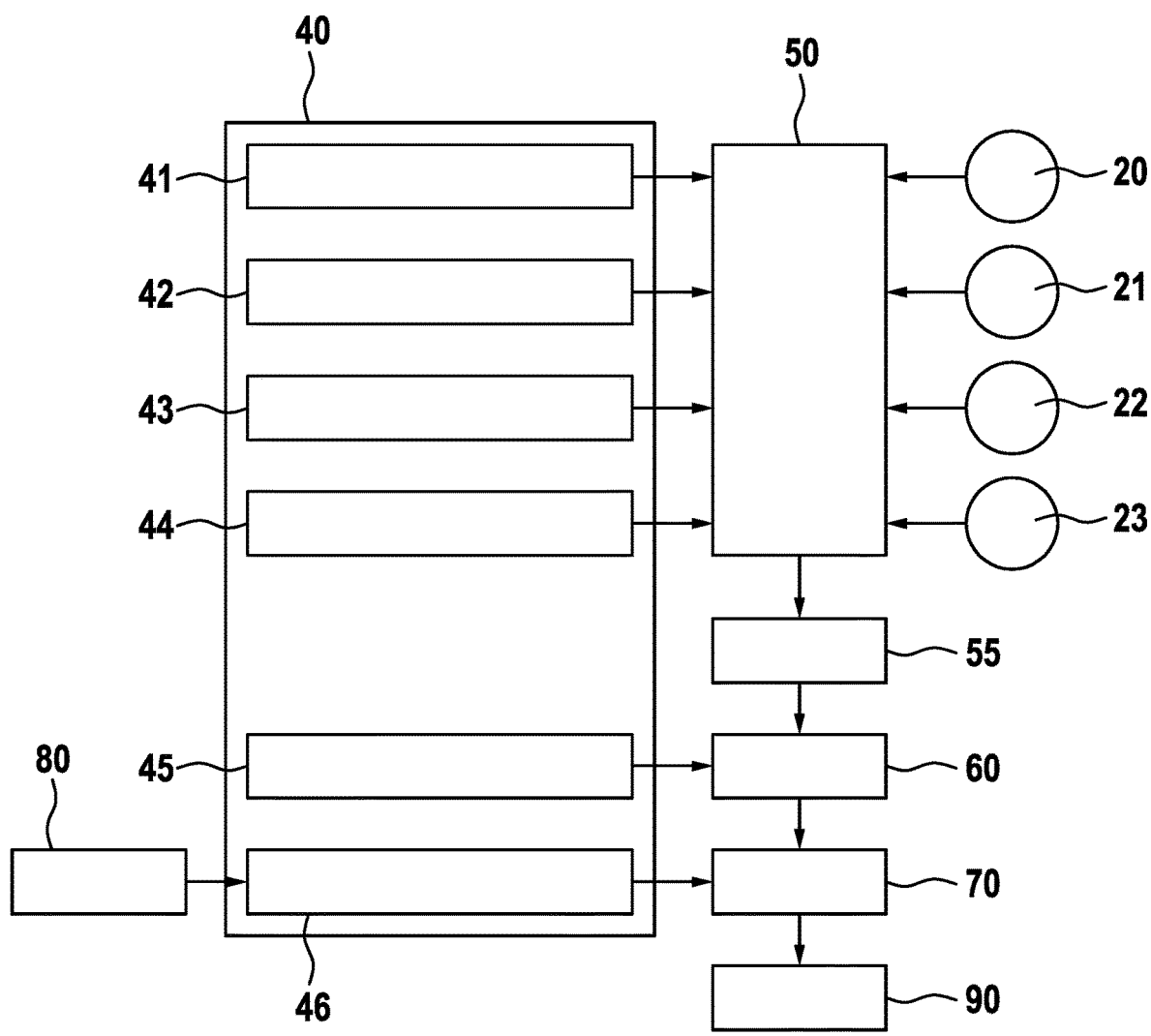

METHOD AND SYSTEM FOR DETERMINING AT LEAST ONE PHYSICAL VALUE

CROSS-REFERENCE TO RELATED APPLICATIONS

This United States application claims priority to German Patent Application No. 10 2020 109 859.6 filed 8 Apr. 2020, which is incorporated herein by reference.

The present invention relates to a method for determining at least one physical value in a space. Furthermore, the present invention relates to a computer program set up to carry out each step of the method, and a machine-readable storage medium, on which the computer program is saved. Finally, the present invention relates to a system by means of which the at least one physical value can be determined.

PRIOR ART

In the food industry, process safety plays a primary role. On the one hand, it is the prerequisite for compliance with statutory regulations or guidelines, for example relating to hygiene, and on the other hand that, during the manufacturing process, food is treated in such a way that a desired or required final quality can be achieved. This requirement leads to a plurality of parameters of the food manufacturing process being detected virtually completely by sensor technology. In order to ensure comprehensive transparency and visibility of the state of a system and thus to recognise anomalies in good time and, ideally, to spatially isolate the cause of the anomaly, the use of a large number of sensors is necessary.

EP 1 157 319 B1 describes a system and a method for preparing food using a precise online controller for a heat transfer process. The food preparation system comprises a heating chamber and/or cooling chamber, a sensor and a controller. During a phase of the remote transfer process, the chamber transfers heat to or from the food. The sensor detects the actual temperature in the heating chamber and/or cooling chamber in real time. The controller controls the heating chamber and/or cooling chamber according to a planned time/temperature profile. The method simulates the internal temperature of the food in real time based on the actual temperature of the chamber. The calculation of the internal temperature is based on the finite-element method.

An object of the present invention is to enable the determination of at least one physical value even for spaces with complex geometry at positions where no sensor is provided for measuring the at least one value. A further object of the invention is to provide a system which makes it possible to carry out the method.

US 2019/0331832 A1 describes a method for determining a microclimate in a limited geographic area. Multiple sensors are situated in the geographic area.

In US 2014/0334519 A1, a method for monitoring a temperature at a surface of a room is described. Here, multiple sensors are arranged on the surface, by means of which temperature values are measured point by point. Temperature values are determined by means of extrapolation for other points where there is no sensor.

US 2014/0257740 A1 discloses a method for modelling a spatial temperature map of the room. Temperature sensors are arranged in this room and the temperature map is completed by means of interpolation between the sensor values.

DISCLOSURE OF THE INVENTION

In one aspect of the invention, this object is solved by a method for determining at least one physical value in a space in which several sensors are arranged. These sensors are set up to measure the at least one value. This physical value can be, for example, a temperature value or a value of humidity. Furthermore, the physical value can be, for example, a brightness, a vibration, a pressure or an inclination. For several positions in the space where there is no sensor, the at least one value is respectively determined from measured values of the sensors. This makes it possible to provide virtual measurements for the positions and thus to obtain information about the at least one value in different positions inside the space without having to provide a sensor at each of these positions.

If the method is to be used to determine several different physical values, such as temperature and humidity, for example, then it is preferred that the sensors each contain several sensor elements, wherein each sensor element enables the measuring of one of the values. In this way, a plurality of different physical values can be determined without requiring a large number of sensors to do so. In addition, this ensures that all different values are respectively measured at the same positions.

Preferably, a 3D value map is compiled from several values. This means that at least one value is allocated to each three-dimensional position in the space. The three-dimensional image, obtained in this way, of the value distribution can be regarded as a virtual three-dimensional sensor. By means of a regular retrieval of the 3D value map, anomalies can be recognised in good time and can be spatially isolated using suitable methods. Unusual states of the at least one physical value can also be identified at locations where no sensor is attached and can thus support the machine efficiency and process safety in the space.

The at least one value is determined by means of interpolation and/or extrapolation from the measured values. This makes it possible to simply determine the at least one value with the aid of a mathematic model without further information about the space having to be known for this.

In the interpolation or extrapolation, a linear function, a polynomial function or a spline function is preferably used. The function can be chosen, in particular, depending on the number and arrangement of the sensors.

If a higher degree of accuracy is desired during the determination of the at least one value, it is alternatively provided the at least one value is determined by means of a physical model or a logical model. Model properties can be provided to a computer, for example, before the start of the method via an interface, on which computer the method is carried out. This can be carried out in the form of CAD data, for example. In another alternative, it is possible to determine the model properties by means of the sensors using a learning method. This learning method can be carried out when the space for this is brought into a defined state. For example, for this, a machine arranged in the space can be heated to a defined homogeneous temperature when the physical value is a temperature. Various objects in the space can also be heated to different defined temperatures. The model properties can then be determined by means of predictions from the measured values of the sensors (curve fitting). If the physical value is a humidity, a defined state can be achieved, for example, by the space being ventilated to achieve homogeneous humidity distribution.

It is preferred that the model contains geometries of objects in the space. The objects can be, for example, walls which delimit the space, windows which enable an air exchange with the surroundings, fans which cause air movement, or heaters which emit heat. In doing so, the influence of these objects on the propagation of heat or humidity, for example, between two sensors can be taken into consideration.

Furthermore, it is preferred that the model contains material data of the objects. If the physical value is the temperature, then the heat conductivity and the heat capacity of the objects are material data relevant to the model. If the value is the humidity, then the impermeability of the objects, for example, is relevant in order to be able to determine the humidity distribution in the space.

Furthermore, it is preferred that the model contains data about sources and/or sinks of physical parameters in the space. On the one hand, these physical parameters can be the value itself, i.e. heat or humidity, for example, yet on the other hand, parameters which influence the distribution of the value in the space, such as air currents, for example.

The physical model can be, in particular, a numerical or an analytical model. In an embodiment of the method in which a numerical model is used, the space can be depicted in particular by finite elements, the measurements of which being allocated to the sensors as number values. At points where there is no sensor, the values are then calculated numerically with the aid of the measured sensor values by using the laws of physics. If the physical value is the temperature, then the heat equation, for example, can be used for this. If the physical value is the humidity, then the laws of diffusion, for example, can be used.

In an embodiment of the method in which the model is an analytical model, the spatial dependencies are depicted, in particular by mathematical functions which contain freely selectable parameters. The mathematical functions are the result of the laws of physics. The mathematical functions can be polynomials, for example. In this case, the freely selectable parameters are coefficients of the polymers, for example. The parameters can be determined based on the values measured by means of the sensors. At positions where there is no sensor, the values can then be calculated from the functions with the aid of known parameters.

The at least one value of a position is compared to a perturbation value or a range of the perturbation value, which is stored for its position in the space. Depending on a result of the comparison, an anomalous state is concluded. In this way, an anomalous state can be recognised in good time when this is already obvious in the space at a certain position because of a single value without a sensor having to be applied at this position.

Alternatively, values are determined for several positions in the space and compared with a perturbation pattern which is stored for these positions. Depending on a result of the comparison, an anomalous state can be concluded. This embodiment of the method makes use of the fact that values can be provided for a plurality of positions without requiring sensors at these positions for this. Anomalous states can then also be recognised, which do not become clear by means of a single value in a single position, but rather only by a pattern of values at different positions which refer to an anomalous state only in this combination. Here, the pattern can consist both of several values of the same physical quantity at different positions in the space and of a combination of different physical quantities. Thus, the method makes it possible to also recognise an anomalous state, for example, which is characterised by a certain temperature at a point in the space and a certain level of humidity at another point in the space occurring at the same point in time.

Recognising anomalous states can be used, in particular, in order to introduce immediate counter-measures. But this can also be used, for example, in order to undertake a causal analysis by it being considered, in the event of the anomalous state occurring several times, whether this always occurs at certain points in time.

In a further aspect of the invention, a computer program is provided which is set up to carry out each step of the method, in particular when it runs on a computer or electronic control unit. It makes it possible to implement different embodiments of the method on a computer without having to undertake constructive changes on it. In order to install the computer program on the computer, in yet another aspect of the invention, a machine-readable storage medium is provided on which the computer program is stored.

Moreover, in an aspect of the invention, the object is solved by a system which is set up in order to determine at least one physical value in a space. This system has several sensors which are arranged in the space. Moreover, it has a database in which information about the space is stored. Finally, it has a computer which is set up in order to determine the at least one value by means of the method.

The information about the space preferably comprises at least at which position in the space each individual sensor is arranged and which physical parameter it measures. When the determination of the at least one value is provided in the method by means of a physical model or a logical model, then it is further preferred that physical properties of the media and materials lying between the sensor positions are stored in the database. The physical properties can be, in particular, mechanical or thermodynamic properties, such as heat conductivity, for example. Furthermore, it is preferred that the information includes properties of a shell of the space. If the space is a building, then these would be properties of the building shell, for example.

In order to not only be able to determine the at least one physical value by means of the system, but rather to also be able to evaluate it to recognise anomalous states, it is further preferred that the system has an evaluation unit, which is set up in order to conclude an anomalous state from the comparison of a value with a perturbation value or a range of a perturbation value or several values with a perturbation pattern. Moreover, the evaluation unit is preferably set up in order to emit an error message. Furthermore, in this case, the system comprises an input unit by means of which perturbation values and/or perturbation patterns can be input into the database. Moreover, it is preferred that the database contains information about machines that are arranged in the space. Perturbation values and perturbation patterns can be derived from tolerances, relating to the physical value, of the individual machines. Moreover, physical properties of the materials of which the machines consist can be stored.

Finally, it is preferred that the system has a linking unit which is set up in order to link several values determined by the computer. This linking can be used as the foundation for a quick comparison of several values with a perturbation pattern. For this, it is further preferred that linking rules for the combination of several values are contained in the database.

BRIEF DESCRIPTION OF THE DRAWINGS

Exemplary embodiments of the invention are depicted in the drawings and explained in more detail in the description below.

FIG. 3 schematically shows a system according to an exemplary embodiment of the invention.

EXEMPLARY EMBODIMENTS OF THE INVENTION

Figure 1:
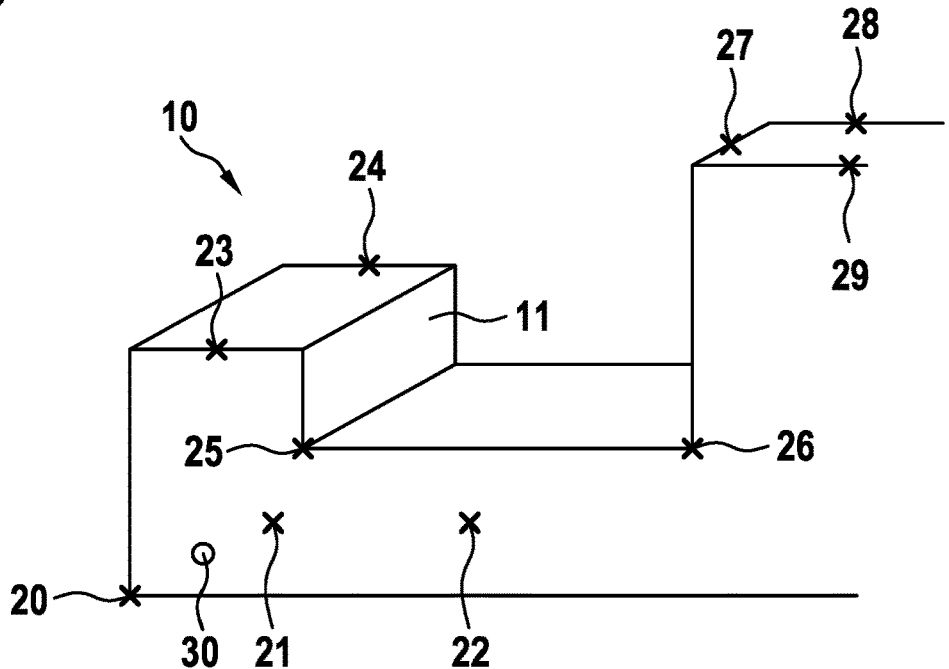
FIG. 1 schematically shows a space in which a physical value can be determined by means of a method according to an exemplary embodiment of the invention.

In an exemplary embodiment of the invention, a machine 11 is arranged in a space 10, on the surface of which machine ten sensors 20 to 29 are arranged. The sensors 20 to 29 are temperature sensors. In a first exemplary embodiment of the method, the temperature at all positions of the space 10 where none of the sensors 20 to 29 are arranged is determined by means of a mathematical model from the measurements of the sensors 20 to 29. For example, the value of the temperature at position 30 can be determined by interpolation from the measurements of the first sensor 20 and the second sensor 21. When the first sensor 20 measures a temperature of 8° C. and the second sensor 21 measures a temperature of 12° C., then a temperature of 10° C. at position 30 emerges as a result of linear interpolation.

Figure 2:
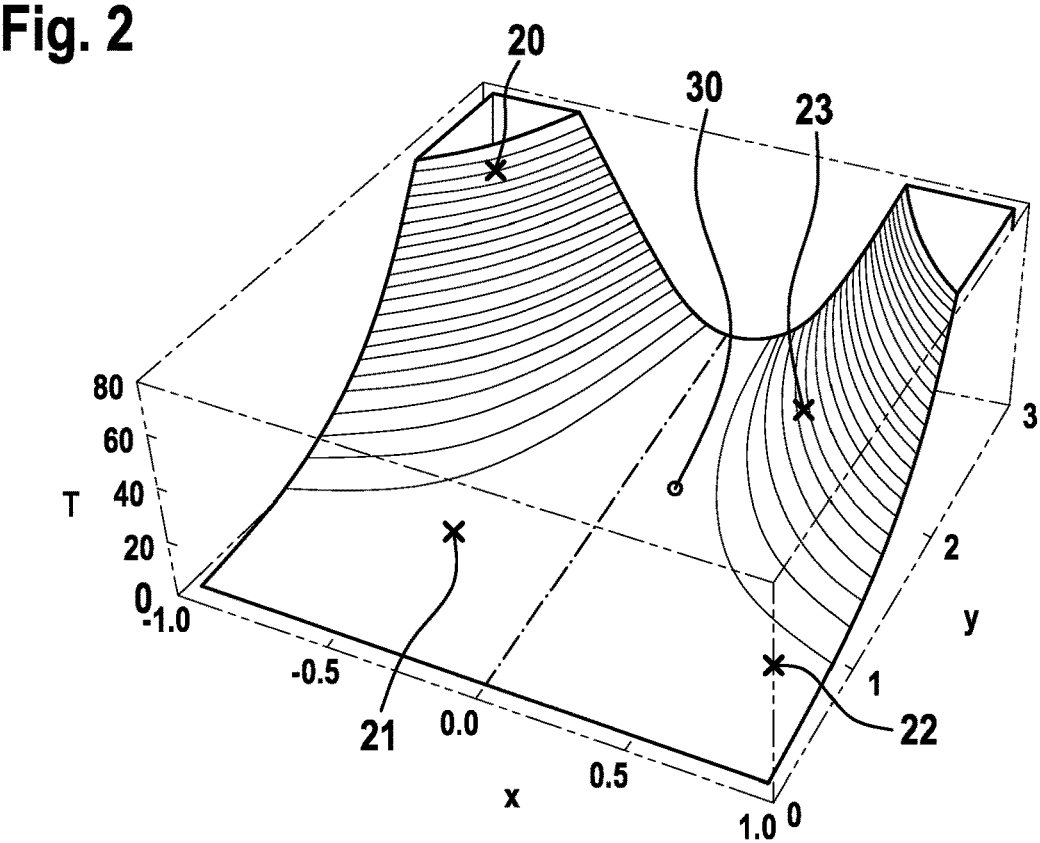
FIG. 2 shows a value map which can be compiled by means of a method according to an exemplary embodiment of the invention.

In a second exemplary embodiment of the method, four sensors 20 to 23 are arranged in the space 10. A 3D value map is generated from the measurements of these four sensors, on which map a temperature value is allocated to each position. FIG. 2 shows a section along an x-y plane, through the 3D value map. Here, the temperature T is visualised as a third coordinate via the interface. In further exemplary embodiments of the method, the temperature can be depicted by colour coding, for example as a spectral course or hot-cold course or, as a number value, projected into a three-dimensional image of the space 10 as a number cloud. If this visualisation method were applied to the space 10 depicted in FIG. 1, then a temperature value of 10° C., for example, would be projected at position 30 on the surface of the machine 11.

In a third exemplary embodiment of the method, a 3D value map is compiled by means of a physical or logical model. To do so, a system is used which is depicted in FIG. 3. This has a database 40 with several partitions 41 to 46. In the first partition 41, the positions of all sensors of the system are stored in three dimensions in the space 10. In this exemplary embodiment, the system has four sensors 20 to 23. Furthermore, it is stored as to which physical parameter is measured by these sensors. In this exemplary embodiment, all sensors 20 to 23 measure the temperature. The second partition 42 stores the heat conductivity between the positions of the sensors 20 to 23. The third partition 43 contains information about the heat conductivity and heat capacity of the shell of the space 10. Information about machines and objects arranged in the space 10 is stored in the fourth partition 44. The fifth partition 45 contains linking rules for linking temperature values of different positions in the space 10. The sixth partition 46 contains perturbation patterns for individual combinations of temperature values and their correlation to known error descriptions of the machines arranged in the space 10.

A computer 50 is provided in order to compile a 3D value map 55 of the temperature in the space by using the measurements of the sensors 20 to 23 and the information from the first four partitions 41 to 44 and by using a physical or logical model. In the same way as in the second exemplary embodiment, this can be visualised. A linking unit 60 links individual values from the value map 55 to form patterns by using the linking rules from the fifth partition 45. In an evaluation unit 70, these patterns are compared to perturbation patterns from the sixth partition 46. If a sufficient accordance between a pattern compiled by the linking unit 60 and one of the perturbation patterns is recognised, then an error message 90 is emitted, wherein the error linked to the perturbation pattern in the sixth partition 46 is labelled. An emitting unit 80 makes it possible to add further perturbation patterns in the sixth partition 46 as needed.

The invention claimed is:

1. A method for determining at least one physical value, selected from temperature, humidity, brightness, vibration, pressure or inclination, in a space (10) in which several sensors (20-29) are arranged, which are set up to measure the at least one value, said method comprising:
wherein the at least one value is respectively determined at a position where there is no sensor (20-29) from measured values of the sensors (20-29) for several positions (3) in the space (10) by means of interpolation and/or extrapolation of the measured values a physical model or a logical model using the measured values;
the at least one value determined by means of interpolation and/or extrapolation or by means of a physical model or a logical model is compared to a perturbation value or a range of a perturbation value which is stored in the space (10) for the position or several different values determined by means of interpolation and/or extrapolation or by means of a physical model or a logical model are compared to a perturbation pattern which is stored for the position; and
wherein an anomalous state is concluded depending on a result of the comparison.

2. The method according to claim 1, wherein a 3D value map (55) is compiled from several values.

3. The method according to claim 1, wherein at least one linear function, polynomial function or spline function is used during the interpolation and/or extrapolation.

4. The method according to claim 1, wherein the model contains geometries of objects (11) in the space (10).

5. The method according to claim 4, wherein the model contains material data of the objects (11).

6. The method according to claim 1, wherein the physical or logical model contains data about sources and/or sinks of physical parameters in the space (10).

7. The method according to claim 1, wherein the physical or logical model contains data about the properties of a shell of the space.

8. The method according to claim 1, further comprising a computer program which is set up in order to carry out each step of the method.

9. The method according to claim 8, further comprising a machine-readable storage medium on which the computer program is stored.

10. A system which is set up in order to determine at least one physical value, selected from temperature, humidity, brightness, vibration, pressure or inclination, in a space (10), said system comprising:
several sensors (20-29) which are arranged in the space (10);
a database (41) in which information about the space (10) is stored; and
a computer (50) which is set up to determine the at least one value where there is no sensor (20-29) by respectively determining the at least one value from measured values of the sensors (20-29) by means of interpolation and/or extrapolation for several positions (30) in the space (10) or the at least one value is respectively determined from measured values of the sensors (20-29) by means of a physical model or a logical model; comparing the at least one value determined by means of interpolation and/or extrapolation or by means of a physical model or a logical model to a perturbation value or a range of a perturbation value stored in the space (10) for the position or comparing several different values determined by means of interpolation and/or extrapolation or by means of a physical model or a logical model to a perturbation pattern stored for the position; and an anomalous state is concluded depending on a result of the comparison.

11. The system according to claim 10, further comprising:
- an evaluation unit (70) which is set up to conclude on an anomalous state from a comparison of at least one value with a perturbation value or a range of a perturbation value or several values with a perturbation pattern; and
- an emitting unit (80), by means of which perturbation values and/or perturbation patterns can be input into the database.

12. The system according to claim 11, wherein the evaluation unit (70) is set up in order to emit an error message (90).

13. The system according to claim 10, further comprising:
- a linking unit (60) which is set up in order to link several of the values determined by the computer (50).

* * * * *